US006624919B2

(12) United States Patent
Lambert (10) Patent No.: US 6,624,919 B2
(45) Date of Patent: *Sep. 23, 2003

(54) LIGHT SCANNER WITH CYLINDRICAL LENSES

(75) Inventor: Nicolaas Lambert, Waalre (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/790,189

(22) Filed: Feb. 22, 2001

(65) Prior Publication Data

US 2001/0038483 A1 Nov. 8, 2001

Related U.S. Application Data

(63) Continuation of application No. 09/282,323, filed on Mar. 31, 1999, now Pat. No. 6,288,815.

(51) Int. Cl.[7] .............................................. G02B 26/08
(52) U.S. Cl. ....................... 359/196; 359/205; 359/209; 359/210
(58) Field of Search .............................. 359/204–207, 359/209–211, 216–219

(56) References Cited

U.S. PATENT DOCUMENTS

| | | | | | |
|---|---|---|---|---|---|
| 5,450,219 | A | * | 9/1995 | Gold et al. | 359/40 |
| 5,701,190 | A | * | 12/1997 | Mochizuki et al. | 359/205 |
| 5,959,759 | A | * | 9/1999 | Hamada | 359/204 |
| 6,288,815 | B1 | * | 9/2001 | Lambert | 359/196 |

* cited by examiner

Primary Examiner—James Phan
(74) Attorney, Agent, or Firm—Aaron Waxler

(57) ABSTRACT

A scrolling scan optical band scanner is provided having a scrolling scan optic with a scan function that inherently deviates from an ideal imaging function over wide apertures. Compensation optics are provided to correct the scrolling scan optic performance to provide accurate imaging over a wide aperture. The compensation optics and the scrolling scan optic together accurately scroll the input pattern to an output pattern according to the formula:

$$x_o(t)/X = (t/T + x_i/X) \text{ modulo } 1,$$

with X being the total height of input and output beam, $x_i$ being the ray height in the input beam, $x_o$ being the corresponding ray height in the output beam as a function of time, T being the frame period, and t being the time, and said scroll patterns remains telecentric even where X is large with respect to a physical size of the scanning optic system.

20 Claims, 7 Drawing Sheets

LIGHT SCANNER WITH CYLINDRICAL LENSES

CROSS REFERENCE TO RELATED APPLICATIONS

This is a continuation of application Ser. No. 09/282,323, filed Mar. 31, 1999, now U.S. Pat. No. 6,288,815.

FIELD OF THE INVENTION

The present invention relates to improved scroll scanning systems, and in particular, to systems which provide imaging of scrolling multiple color bands across a single-panel reflective or transmissive display device in a video projector.

BACKGROUND OF THE INVENTION

A known color projection display system includes a monochromatic flat panel display device that is, in operation, sequentially illuminated with light. The modulated light pattern from the display device is then projected onto a display surface. For color projection, monochromatic light sources or selectively filtered light sources are sequentially scanned over the flat panel display device at a repetition rate sufficient that the human eye perceives a single color image. The human eye thus integrates this "color sequential" display of three separate images into a "single" image. By providing a single flat panel display device, a common optical path is provided for all colors, and convergence and misregistration errors are substantially eliminated.

To provide efficient illumination of the flat panel display device, it is preferred to split white light from a projector lamp into the three basic colors, which are simultaneously employed. Since the components are simultaneously employed, the light output from the projector lamp is efficiently employed. This technique requires that portions of the flat panel display device simultaneously present portions of pixel images for each of the colors. In order to make efficient use of the flat panel display and to avoid degradation of the resolution, each color is ideally presented as a rectangular stripe which scrolls down the panel, sequentially illuminating all regions of the flat panel display device. This technique therefore requires that pixel data for each of the respective colors be updated between the respective color stripe illumination.

In a rotating prism scanning system, the rotating prism assembly repeatedly scans the red, green, and blue bands through a pair of relay lenses, which image the spatially-separated scanning colored light bands onto a light valve panel having an array of pixels. The scanning colored light bands are separated from each other by one-third of the panel height. Each time a light band of one color leaves the bottom of the array, a corresponding light band of the same color appears at the top of the array and begins its scan. Before each colored light band passes over a respective row of pixels, the pixel image data must be loaded into the column conductors while the respective row is selected, and the pixel elements allowed to settle. Because, in this case, three different rows (or bands of rows) will be illuminated substantially simultaneously by the three different colored light bands, either three separate column conductors and drivers must be provided for each column of pixels, or the data must be provided sequentially to the column conductors at three times the video line rate.

The simultaneous use of a substantial portion of the available red, green and blue light through a single light valve panel provides optical efficiencies comparable to that of three-panel systems employing similar types of light valve panels. However, by using only a single panel, the need to mechanically converge different color images formed on different panels is eliminated, and system cost and size is reduced. Additionally, beam combining dichroic filters are not needed, which leads to additional savings. See, Peter Janssen, "A Novel Single Light Valve High Brightness HD Color Projector", Society For Information Display (SID), Technical Paper, France 1993; Shimizu, Jeffrey, "Single Panel Reflective LCD Projector", SPIE (1999).

Typically, the flat panel display device is a thin film transistor (TFT) liquid crystal display (LCD) device, having, for example, a resolution of 1280 by 1024 pixels. Since the image is projected, the display device may be relatively small, i.e., less than about 6 cm. Further, the preferred mode of operation is a reflective mode, which allows use of thinner layers of liquid crystal light modulation material and correspondingly faster response times, since the light passes through the liquid crystal twice. Display technologies other than TFT may be employed, for example known silicon on insulator LCD display devices. Further, the "projection" need not be over a large area, and, for example, a similar technology may be employed in so-called heads-up displays and virtual reality goggles. See, U.S. Pat. Nos. 5,673,059 and 5,642,129, expressly incorporated herein by reference.

In order to achieve the scrolling illumination, scanning mechanisms have been proposed with moving color filters or with static color separation combined with an optical scanning mechanism like a rotating prism. The moving color filter solutions so far have been less light efficient because they tend to discard at least two thirds of the available white light to achieve individual color components. Static color separation, e.g. with dichroic mirrors, is generally much more light efficient because all color components can be used simultaneously. However, in these dichroic mirror systems, the problem is then in designing a scanning mechanism that converts the static color stripes into a useful scrolling color stripe pattern.

One known scanning mechanism is a rotating prism. It suffers, however, from low quality imaging of the color stripes, and it is generally very difficult to achieve uniform scanning for all color components in a single scanning element. Multiple scanning element systems have been proposed, employing rotating prisms (either separated or physically joined), which offer better scan-speed uniformity (for the different color light bands) and scan-speed linearity (for each light band) than the single-prism system, but are less compact. See, U.S. Pat. Nos. 5,845,981, 5,608,467, 5,548,347, 5,532,763, 5,528,318, 5,508,738, 5,416,514 and 5,410,370, expressly incorporated herein by reference.

For a scrolling scanner system, the ideal scan transformation function is:

$$x_o(t)/X = (t/T + x_i/X) \text{ modulo } 1,$$

with X being the total height of input and output beam, $x_i$ being the ray height in the input beam, $x_o$ being the corresponding ray height in the output beam as a function of time, T being the frame period, and t being the time. (The modulo 1 operation returns a value between 0 and 1, equal to the non-integer fraction of the operand. It is the same as the fract( ) function in common computer languages.) This concept is similar to so-called "aliasing", in this case the integer portion of the function being undeterminable based on the state of the output. It is noted that only the phase of the output ray depends on the input ray height in the beam;

the actual output swings always from 0 to X, independently from the input ray height. This means that the scanner has to perform a different geometrical transformation for different incoming ray heights, or aberrations will result in the scrolling light band output.

In one known system, a rotating prism is provided, having a central axis of rotation and an even number of facets symmetrically disposed around the axis. A light source projects parallel beams of the three different respective colors through the prism. Central illumination rays for each of the respective color bands are propagated along a respective path that is directed at the axis of rotation. The ray paths of the outer edges of each color band are directed to converge at an angle $a=(n+1/3mb)$, where n is equal to any non-negative integer (i.e. 0, 1, . . . ), m is equal to 1 or 2, and $b=360°$ divided by the number of prism facets. A combination of optical components is arranged to intercept the illumination rays after their passage through the prism, and to guide and converge the illumination rays, seeking to form on the panel spaced-apart light bands having mutually parallel central illumination rays which scan across the panel as the prism is rotated. The optical elements (i.e. the prism, the lenses and the mirrors) serve to continuously focus on, and scan across, the panel, each of the light bands incident on the facets of the rotating prism. These optical elements are selected and arranged so that, as the prism rotates, the illumination rays for each of the red, green and blue light bands follows an equivalent path, from its image at a respective aperture, to the incidence of the respective light band on the light valve panel. This causes the central illumination rays for all three color bands to continuously strike the panel at the same angle of incidence (preferably orthogonal) as they are scanned across it. As the light paths leave the prism, they converge and cross before entering a lens group. After leaving respective apertures for each path, the central illumination rays for each of the light bands diverge. A set of lens groups is provided to reconverge the illumination rays to form red, green and blue images of the bands on the panel. The scan linearity of the optical system can be improved to a significant degree by making the surfaces of the revolving prism cylindrically concave. These concave surfaces refract the light, seeking to correct imperfections in the scanning function. The correction is, however, incomplete. See, U.S. Pat. Nos. 5,845,981, 5,608,467, 5,548,347, 5,532,763, 5,528,318, 5,508,738, 5,416,514 and 5,410,370, supra.

Likewise, another known attempt to scan a scrolling pattern employs a set of quasi-cylindrical lens elements disposed concentrically on a rotating disk. In this case, the output is non-telecentric and the scan is uncompensated. These quasicylindrical lens elements are employed in a liquid crystal light valve (LCLV) projection system, in which light is scanned by a train of quasi-cylindrical light bending or light reflecting elements that are sequentially interposed between a high intensity reading light source and the liquid crystal device. The quasi-cylindrical light bending elements are mounted on a circular wheel and themselves have a circular shape. The wheel is rotated to sequentially interpose the successive bending elements between the light source and the liquid crystal to cause a narrow elongated band of light to scan in synchronism with the input scan. Because of the curvature of the quasi cylindrical elements, some degree of undesirable lateral scan, orthogonal to the direction of the intended scan, is provided. Because the apparatus scans by employing an angularly deflected beam, telecentric behavior of the beam (constant angle of incidence) is lost. Telecentric behavior is desirable wherever it is important for the beam as a whole to be perpendicular to an object or image plane, such as in a liquid crystal projection system. In this system, it is considered desirable to reduce chromatic aberration, and to eliminate vertical re-trace time as the scanning shifts from one element to another in the train of quasi-cylindrical elements. The scan angle of this system is rather limited. See, U.S. Pat. No. 5,398,082 and WO 94/28672, expressly incorporated herein by reference. In a related design, the rotating lens wheel is replaced by a transparent polygonal body (i.e., a prism) mounted for rotation about an axis and driven in a continuous unidirectional rotation by a motor. Light passing through the polygonal body is twice refracted, to be displaced to an output path that is parallel to the input path. This displacement varies in magnitude as the body rotates, to effect a scanning motion of the light transmitted by the body. The angular displacement is also limited in this system. See, U.S. Pat. No. 5,428,467, expressly incorporated herein by reference. U.S. Pat. No. 5,450,219, expressly incorporated herein by reference, relates to a telecentric illumination scanning system employing a rotating polygonal mirror, which is suitable for scanning only relatively narrow light beams.

U.S. Pat. No. 5,822,025, expressly incorporated herein by reference, relates to a single light valve color projection system that enables sequential display of color. Several rotating glass plates are sequentially inserted between the light valve and the objective. These glass plates create a spatial offset of the image of light valve pixels three times per frame on the projection screen. The sets of plates are rotated by a motor with an axis parallel to the optical axis of the motor, and intersect the image beam at each image frame.

U.S. Pat. No. 5,781,251, expressly incorporated herein by reference, relates to a color single panel projector, including a mechanism for deflecting light into a plurality of directions, and a light panel for receiving the deflected light. The deflecting mechanism includes a transparent optical medium having a nonuniform thickness, in which light beams enter through a center opening of the medium and exit at areas along a side of the medium.

U.S. Pat. No. 5,490,013, expressly incorporated herein by reference, relates to a compensation plate for tilted plate optical aberrations, including astigmatism and coma.

U.S. Pat. No. 5,227,910, expressly incorporated herein by reference, relates to a laser beam scanner including a rotating prism, which receives and deflects the laser beam toward a spherical lens, which receives the laser beam and converges it. A spherical reflector then redirects and focuses the converging laser beam to a laser scan spot along a scan line. The laser beam scanner may include one or multiple prisms, wherein individual prisms may be single or multi-faceted prisms. This system is designed to eliminate across-scan error, seeking to generate a mathematically perfect scan line.

U.S. Pat. No. 5,166,820, expressly incorporated herein by reference, relates to a light scanning system having a first scanning unit for guiding the light beam in a first scanning direction, a second scanning unit including a deflection prism for guiding the light beam in a second scanning direction, and an object lens. The second scanning unit has a common optical axis with the first scanning unit and is movable in an optical direction in parallel with an optical axis or turnable around the optical axis, so that the light beam entering the second scanning unit may be deflected in any direction when exiting from the second scanning unit.

EP 0,248,204 A2 relates to a color filter wheel-based optical scanning system employing either standard color filters or diffraction grids to rapidly select a color component, allowing a single CCD image sensor array to can handle full color. The light is collimated into a narrow band of light.

U.S. Pat. No. 5,479,187 relates to an optical scanning system employing a wheel with simple planar mirror facets, suitable for scanning relatively narrow light beams. The angle of incidence of the illumination varies over the height of the panel EP 0,749,246 A1 relates to a system having a color wheel arrangement that provides illumination pulses of color illumination components over the entire panel (in this case a digital is mirror display). The illumination switches between color components more or less instantaneously over the entire panel. The panel addressing must be very fast to allow this without artifacts. Because both color illumination switch and panel addressing are not infinitely fast, some blanking is provided between color component transients. See, also U.S. Pat. No. 5,658,063.

Projection systems are also described in several U.S. patents, including U.S. Pat. No. 4,650,296 to Koda et al for Liquid Crystal Light Valve Color Projector, U.S. Pat. No. 4,343,535 to Bleha, Jr. for Liquid Crystal Light Valve, U.S. Pat. No. 4,127,322 to Jacobsen, et al for High Brightness Full Color Image Light Valve Projection System, U.S. Pat. No. 4,191,456 to Hong, et al for Optical Block for High Brightness Full Color Video Projection System, U.S. Pat. No. 5,264,880, to Sprague et al., for method and Apparatus for projecting a Color Image, U.S. Pat. No. 5,644,357 to Cohen, et al. for Burst Driving of Single-Panel Display, and U.S. Pat. No. 5,684,504 to Verhulst et al., for Display Device, each of which is incorporated herein by reference.

SUMMARY AND OBJECTS OF THE INVENTION

According to the present invention, the scan non-linearities caused by the use of a single prism to scan all three colors (RGB) in a single panel scrolling raster display system are reduced and/or corrected by employing static cylindrical lenses to prefocus and postfocus the static color stripe pattern passing through a scanning element, in a manner to achieve the correct scan function for all ray heights of the input pattern. Thus, the outer rays of color stripe pattern entering the scanning prism will undergo the same scrolling function as the center rays of the color stripe pattern, maintaining scan quality over a wide input aperture.

According to the present invention, the prefocus and postfocus lenses are generally positive lenses (real focus, e.g., plano-convex or convex-convex lenses). Further, these lenses are typically cylindrical, i.e., having a line focus in contrast to the point focus resulting from a spherical lens. Additionally, the prefocus and postfocus lenses are typically symmetric. It should be understood, however, that various known optical systems, such as apochromatic (or other compound) lens structures, binary or Fresnel optical structures (possibly optimized for the particular color band operated on) may also be employed. Reflective or diffractive optics may also be employed for the pre and/or post focus structures.

According to the present invention, the scanning element preferably also has an optical power, which cooperates with the prefocus and postfocus lenses to correct the scan function. In this case, however, the scanning element may have a positive (real focus) or negative lenses (imaginary focus). The scanning element may include two or more optical elements moving in synchrony, which may be joined, e.g., surfaces of a rotating prism, or separate. The scanning element may also include static lenses or optical components as appropriate. Like the prefocus and postfocus optics, the scanning element lenses are typically cylindrical, i.e., having a line focus in contrast to the point focus resulting from a spherical lens, and are arranged for symmetric or antisymmetric movement, to maintain an appropriate desired optical function. Known optical systems, such as apochromatic (or other compound) lens structures, reflective, diffractive, binary or Fresnel optical structures may also be employed.

In order to reduce optical losses and internal reflections, optical surfaces are preferably coated or multicoated in known manner.

As discussed below, a cylindrical optical system is capable of diverting light rays along one axis, while a spherical optical system is capable of diverting light rays along two orthogonal axes. Since the scroll function is a one-dimensional transformation, the moving scroll optic itself typically provides a cylindrical optical function, allowing incident light rays to be transformed according to the scroll function. However, it should be understood that the present invention also encompasses scanning (or time-varying) optical elements having various optical functions, to translate an input image (or image sequence) into a time-varying output image (or image sequence). It is also understood that the time varying characteristic need not result in a simple or true scroll function, and thus, through control over the surface figure of the scan optic or control over the position of scan optic elements, an arbitrary time-varying image transformation between input and output may be applied.

The system according to the present invention therefore includes optical structures that provide a corrected scrolling scan function, for example providing a telecentric scan function for an input set of parallel beams. This is preferably accomplished by employing prefocus and postfocus optics, and a scanning subsystem therebetween adapted to produce a correct scrolling scan function at the output of the postfocus optic.

The present system is considered an imaging system, in that the output represents a scrolling image of the input, and thus is capable of sharply defined zone edges with preservation of image size, optical array patterns, and preservation of other optical information transmitted through the system throughout the scan cycle, including a discontinuity. This is in contrast to typical scroll scan systems according to the prior art, which are non-imaging, meaning that the light rays between input and output become substantially disarrayed and perturbed, especially near discontinuities, and thus various image information is substantially lost.

According to a preferred embodiment, the present invention employs two (or even three or more) synchronized sets of moving cylindrical lenses (e.g., opposite curved surfaces of a rotating prism, or physically separate optical elements, having synchronized movement), and associated prefocus and postfocus optics, that together are capable of proper imaging scroll scanning of a set of slits of illumination. Because the scroll scanning function is corrected, the system is usable with a wider set of slits than an uncorrected design. This, for example, allows a greater number of slits to be provided, reduces artifacts, and increases display contrast as compared to prior art systems.

According to the present invention, the output scrolling scan function may be telecentric, i.e., the illumination angle provided on the display panel is uniform over the panel, over a wide angle aperture, for example about 50°, and the entire wide aperture of illumination splits up correctly into separate parts when it scrolls through the panel edge. Thus, the present invention provides a fully imaging scroll. The ability to scan telecentrically is particularly important in optical retardation based display systems, such as liquid crystal display devices. The telecentric illumination results in high light efficiency of the display device, maintenance of high contrast, and reduction in aberrations in the projected image.

Wide slits or bands of illumination are especially suitable for illuminating color-sequential panels that switch relatively fast and have slow decay (such as active matrix addressed liquid crystal panels), making most of the cycle time available for illumination, and, as display device technology advances, allow a greater pixel data bandwidth to be effectively utilized. The system of the present invention provides the advantage of the ability to scroll a relatively wider slit with wider angle of aperture, with less aberration than known systems. This, in turn, allows a reduction in physical size of the scanning system for a comparable aperture. Typically, such smaller scanning systems are lower in cost.

The present invention, in principle, can scroll any full size incoming light pattern in cyclic manner: the part that scrolls off one edge continuously moves in from the other edge. In the important application of a color sequential projection panel, the incoming light pattern consists of three (or four) color bands: Red, Green, Blue (or Red, Green, Blue and White for further improved brightness). The width of the individual color bands (and the corresponding addressing fronts on the panel) may be identical, but in fact can be specifically chosen for best color balance.

In applications which provide a defined image plane and seek to preserve the image, it is understood that the optical system has a focal distance. In contrast, in applications where collimated light enters the system, no image plane is defined, and generally collimated scanned light will exit the system, as is the case with a simple scroll scan system according to the present invention. It is also therefore understood that the optical elements of the scanning system may also interact with or compensate for optical effects in other parts of the system; therefore, it is understood that such interactions and compensations produce effects which are equivalent to the imaging functions described herein for the scanning system in isolation.

While in preferred configurations, the displaceable optics are central, surrounded by compensation optical elements, this is not required. Therefore, it is understood that embodiments with moving prefocus and postfocus elements (e.g., external elements), and static "scanning" optics (e.g., internal elements) are included within the scope of the invention. Known optical principles apply in this instance to define the required compensation function and configuration of the desired compensation elements for the scanning system.

The scanning optical elements are preferably in the form of simple refractive lens elements, however, such scanning optical elements may be provided as reflective elements and/or complex sets of refractive elements. Reflective elements are particularly advantageous, for example, for optical systems that are not made of transparent materials, or where the refractive properties of the material are difficult to control.

The scanning element may take any of a number of forms. For example, a rotating prism, a disk with an optical pattern at the periphery (either radially or tangentially oriented), a drum with the optical pattern on its surface (either parallel or perpendicular to shaft), a set of optical elements on a belt or chain, a set of linearly displaceable optics (with a sawtooth motion reset), or even an adaptive or fluidic optic system. The scan function is implemented by providing optics with at least one non-stationary discontinuity in their optical function. At opposite sides of the discontinuity, the rays are redirected to different positions, corresponding to a scroll roll-over. At other, continuous function-regions of the optic, an incremental change in position over the surface corresponds to a continuous change in optical effect. In a preferred embodiment, the optic comprises a series of discontinuities separated by continuous optical function regions.

Therefore, the present invention comprises a scrolling scanner having an ideal scanning function, well corrected for wide apertures, employing a set of compensated imaging optics compensated for scrolling a set of parallel light bands over a wide field. In this case, a wide aperture may be considered, for example, as the case where sin(x)/x deviates substantially from unity, with respect to the desired accuracy (or tolerance for aberration) of the scanning system, where x is the angle between the most distant band with respect to the central optic axis of the scanner. Some systems may have differing sensitivity to wide aperture inputs, which, of course, would provide somewhat differing tolerable apertures. For example, systems according to the present invention may provide optical apertures which are over 50° total angle with respect to the central optic axis of the scanner. Expressed differently, a scroll scan system according to the present invention allows an input aperture in which $1/f \approx 1$. Prior uncompensated scroll scan systems have input apertures of less than about 40° total angle. Thus, the present invention may make use of nearly the full width between discontinuities of a hexagonal rotating prism, as discussed below with respect to FIG. 9.

The present invention also provides a set of unique scanning optics, including rotating disks and drums, to provide the scrolling function. According to the invention, an optical discontinuity may be present oriented generally axially or radially with respect to the rotational axis, on either a disk or drum type optic. Previously, scrolling scan optics employed rotating prisms, generally analogous to an axially oriented discontinuity on a drum optic. Therefore, this aspect of the present invention provides a rotating optic having an optical function which varies about the periphery thereof. In a preferred embodiment, at any angular orientation about an axis of rotation, the surface figure approximates a cylindrical optic with a spiral (for a disk optic) or helical (for a drum optic) optical discontinuity. Alternately, the rotating optic may include a disk having radially oriented approximately cylindrical optical segments, each separated by a radially oriented optical discontinuity or a drum having axially oriented cylindrical optical segments, each separated by an axially oriented optical discontinuity.

According to another aspect of the invention, the scanning optic comprises a primary scan optic and a secondary transfer optic, said secondary transfer optic providing internal telecentricity for the optical system. The transfer optic may, in turn, comprise one or more sets of optical elements in series which, depending on the requirements, may move in synchrony with the scanning optic element(s).

In general, in a rotating optic scanner design, a larger ratio between disk/drum radius and beam size means smaller imaging errors, but there is a trade-off with compactness and cost of the system. Some of the errors can be corrected optically. For example, in drum based optics with axially oriented lens elements, the optical function can be corrected by modifying the static prefocus and postfocus lenses and drum lenses.

In general, any of the lenses according to the present invention may be replaced by a Fresnel design with piecewise segments.

It is therefore an object of the invention to provide an imaging scrolling optical scanner having a large width and/or wide angle of beam acceptance and high accuracy.

It is a further object of the invention to provide a scrolling optical scanning system which provides imaging of an input, through a scan optic, to an output.

It is another object of the invention to provide a scanning optical subsystem for correction of inherent imaging impairments, including a set of compensation optics for compensating for the imaging impairments, to provide a composite scanning optical system having suitable imaging performance.

These and other objects and features of the present invention will become more fully apparent from the following description and appended claims taken in conjunction with the accompanying drawings.

BRIEF DESCRIPTION OF THE DRAWINGS

For a better understanding of the invention, reference is made to the drawings, which are to be taken in conjunction with the detailed specification to follow:

FIGS. 4A, 4B, 8C and 4D show, respectively, three different scroll conditions and the effect of acceptance angle of the second embodiment.

DETAILED DESCRIPTION OF THE PREFERRED EMBODIMENTS

The invention will now be described by way of the drawings, in which corresponding reference numerals indicate corresponding structures in the figures.

EXAMPLE 1

Figure 1:
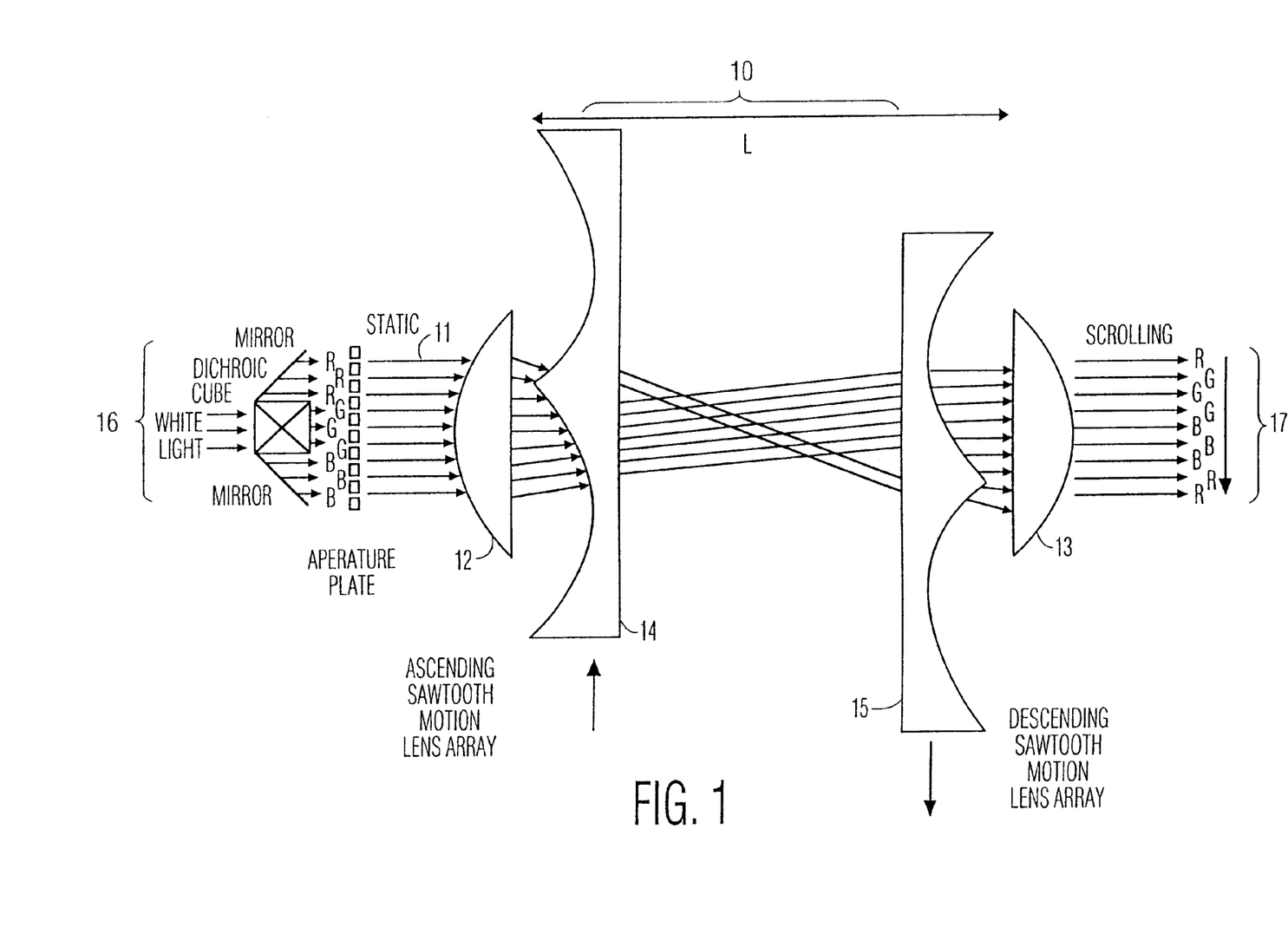
FIG. 1 is a side view of a first embodiment of the invention.

A first embodiment of the invention, shown in FIG. 1, uses a static cylindrical lens 12 to prefocus the static color-stripe pattern 11 into the scanning element 10. This makes it possible to achieve the correct scan function for all input ray heights; the height difference is translated into a phase pre-correction for the actual scanning element 10. A postfocus cylinder lens 13 is then used to back convert the translation after the actual scanning function by the scanning element 10.

FIG. 1 shows an embodiment where the scanning element 10 itself consists of two arrays 14, 15 of negative cylinder lenses that move in opposite directions. The static positive prefocus 12 and postfocus 13 lenses, and the moving negative lenses 14, 15, all have a focal length approximately equal to the distance L between input and output. For ideal lenses, all very close to the respective input and output planes, the focal length should be equal to distance L. In practice, however, lenses are not perfect, have to be separated from each other, and may move in less than an ideal way, so the optimal focal length may deviate a bit from this.

Figure 2A:
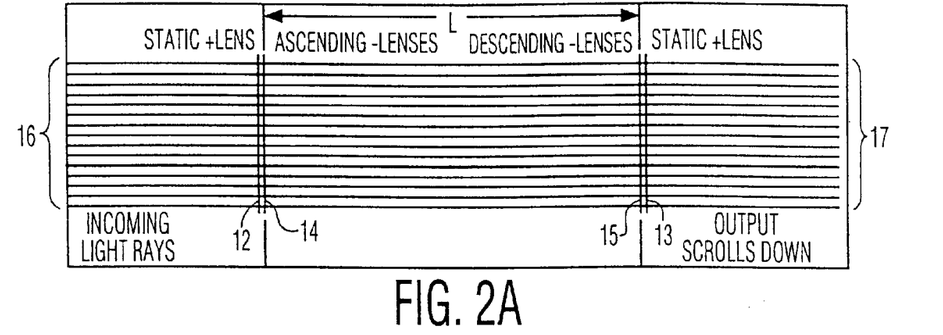
FIGS. 2A, 2B, 2C and 2D show, respectively, three different scroll conditions and the effect of acceptance angle of the first embodiment.
Figure 2B:
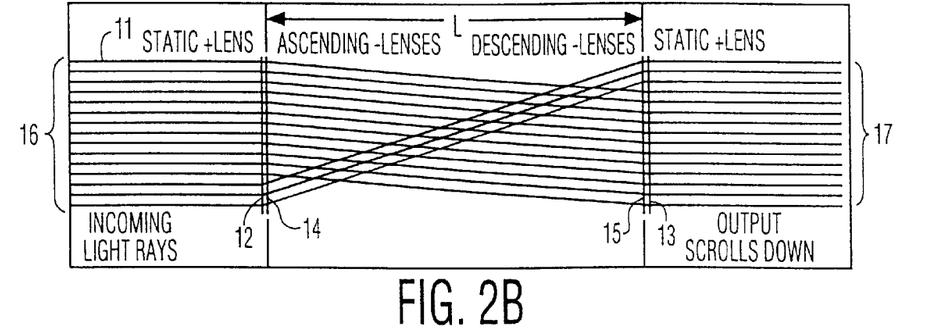
Figure 2C:
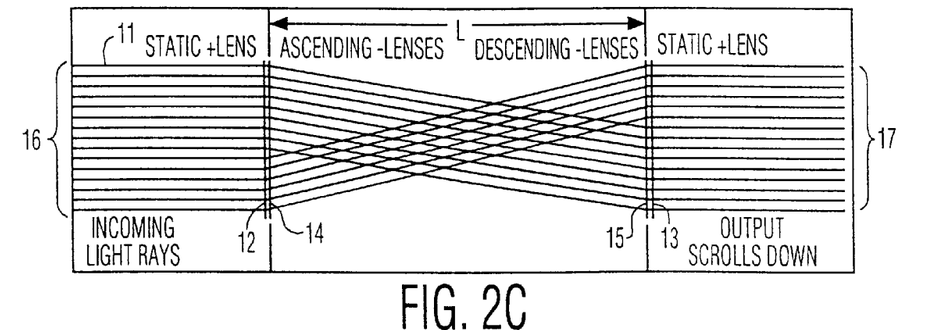

The moving array lenses 14, 15 are butted together and have a size equal to the input 16 and the output 17 beam aperture. FIGS. 2A, 2B and 2C show the scan function at three different points in time. FIG. 2A shows the situation where all four lens elements 12, 13, 14, 15 are perfectly aligned; the positive lens action of the prefocus 12 and postfocus 13 lens is simply canceled by the corresponding array lens 14, 15 of equal but opposite strength. FIGS. 2B and 2C illustrate the scan function for equal but opposite shifts of the arrays 14, 15. For synchronous linear array movement and ideal lenses, the output light pattern is according to the ideal scan transformation described above.

Figure 2D:
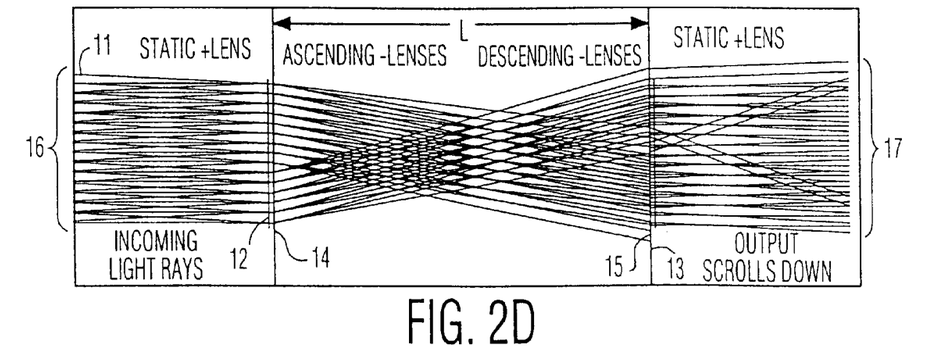

FIG. 2D shows the effect of a finite opening angle (divergence) of the input beam. Some rays that correspond to the outer edges of the input beam are output at a very divergent angle and effectively lost.

EXAMPLE 2

Figure 3:
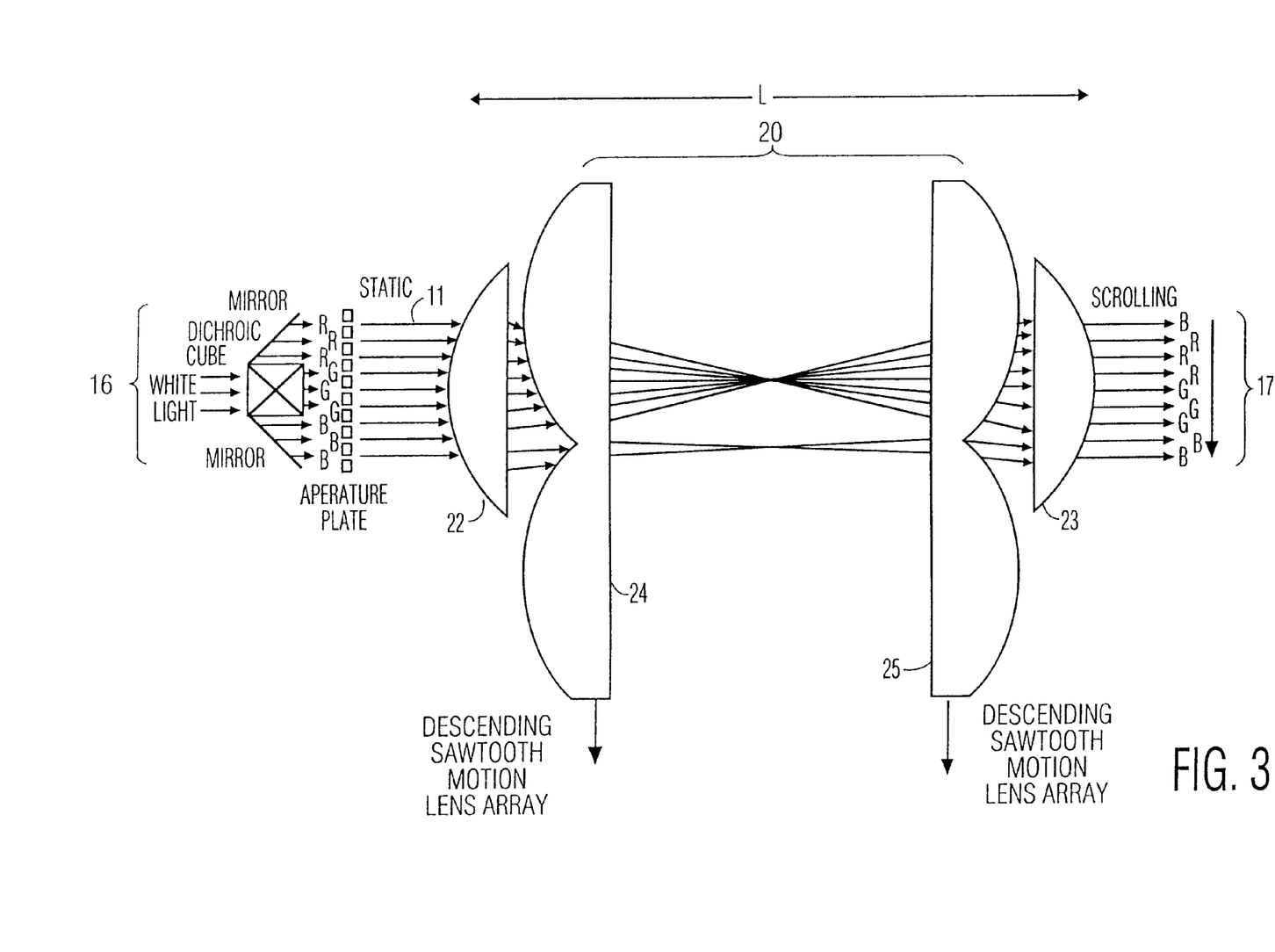
FIG. 3 is a side view of a second embodiment of the invention.

FIG. 3 shows a second embodiment of the invention wherein the scanning element 20 itself consists of two arrays of positive cylinder lenses 22, 23 that move in the same direction. Again, the static prefocus lens 22, the postfocus lens 23, and the two arrays of moving lenses 24, 25 all have a focal length approximately equal to the distance L between input and output, and the array lenses 22, 23 have a size equal to the input and output beam aperture. The mechanism is very similar to that described with respect to FIG. 1, but now the input light pattern is effectively output up-side-down.

Figure 4A:
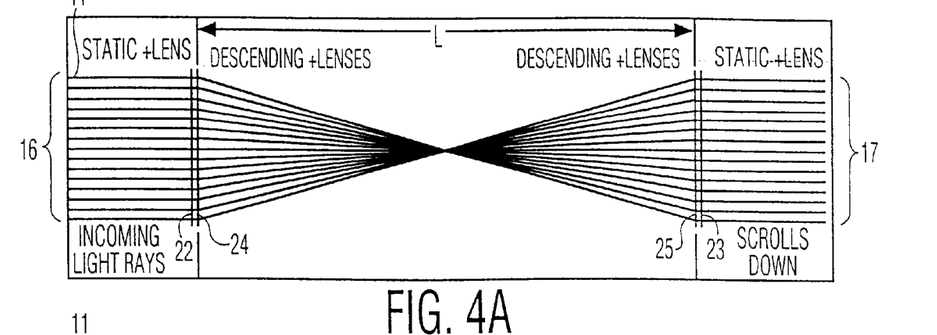
Figure 4B:
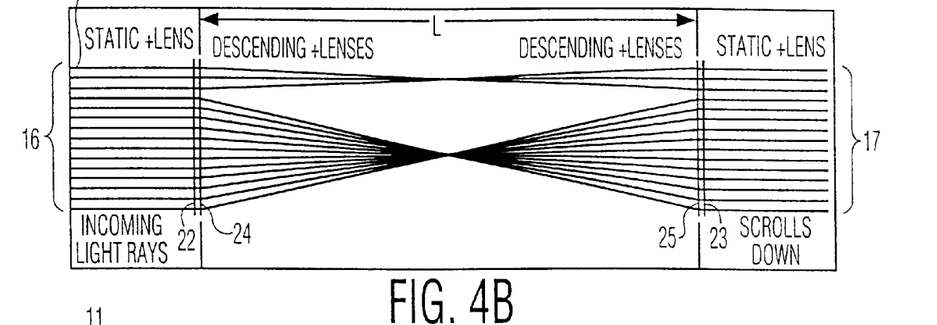
Figure 4C:
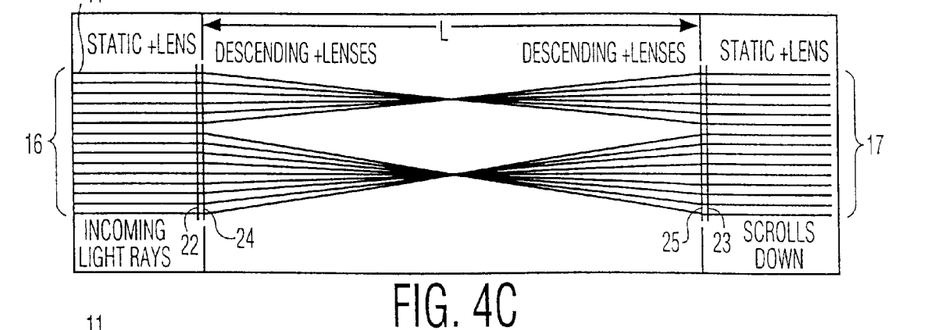

FIGS. 4A, 4B and 4C show the scan function at three different points in time. FIG. 4A shows the situation where all four lens elements 22, 23, 24, 25 are perfectly aligned. FIGS. 4B and 4C illustrate the scan function for equal but opposite shifts of the arrays 24, 25.

Figure 4D:
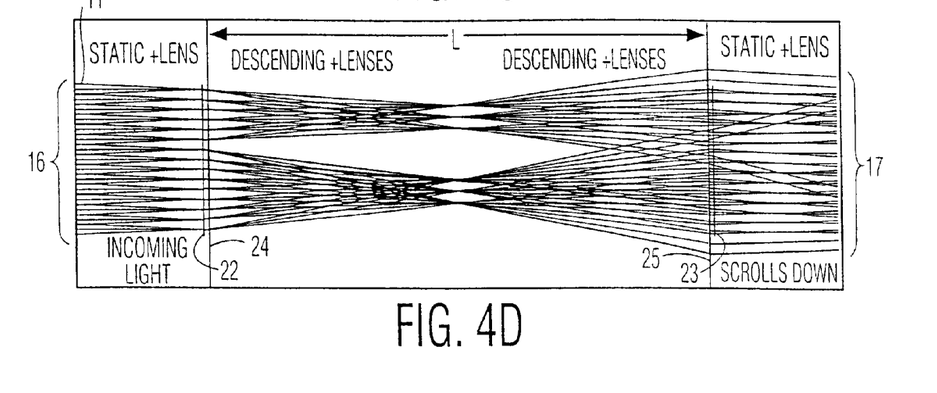

FIG. 4D shows the effect of a finite opening angle (divergence) of the input beam. Some rays that correspond to the outer edges of the input beam are output at a very divergent angle and effectively lost. This is a result of the absence of a true telecentric relay element in the system that images the input array onto the output array. Depending on the various system dimensions and other parameters this may or may not be acceptable.

EXAMPLE 3

Figure 5:
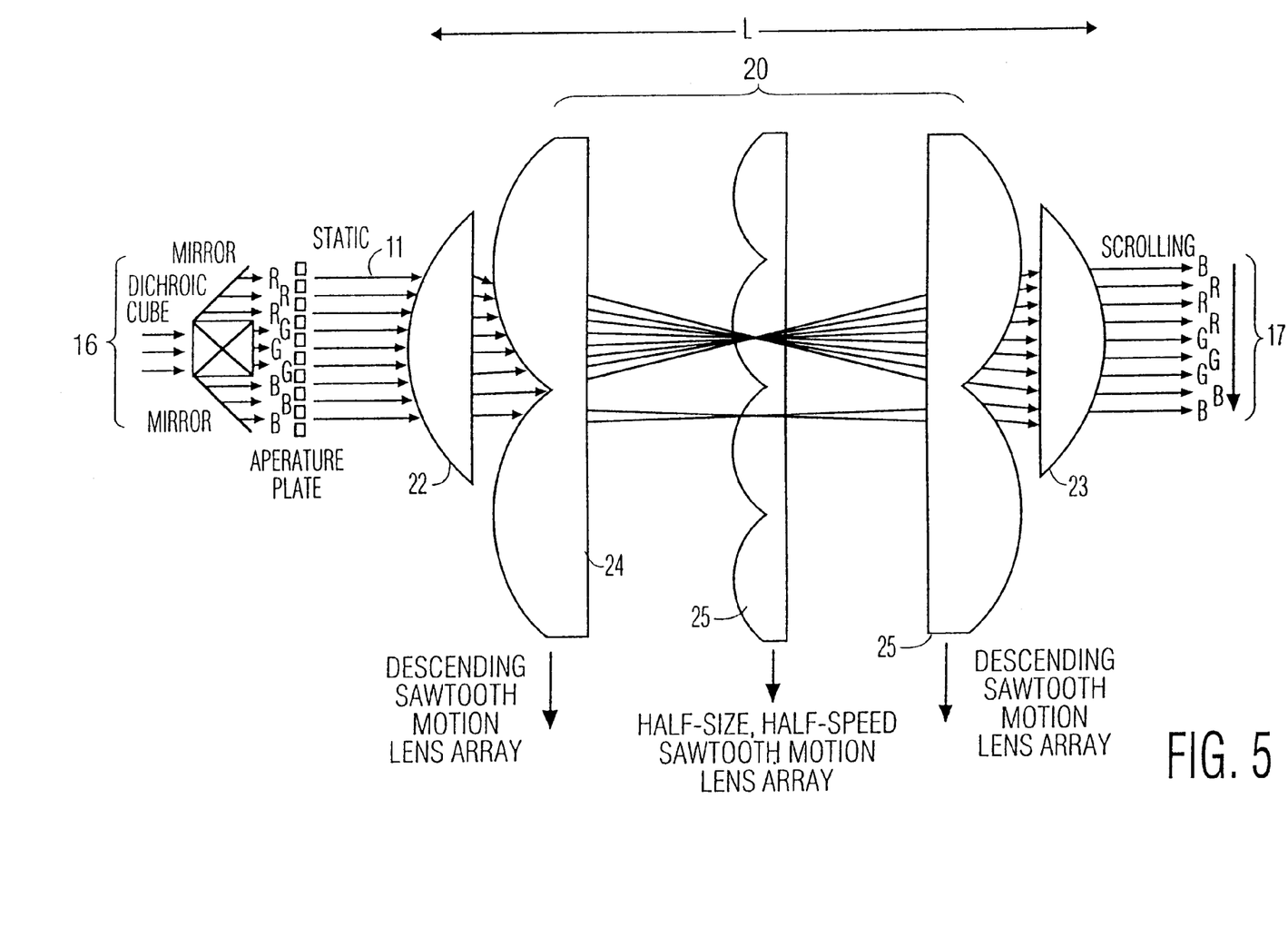
FIG. 5 is a side view of a third embodiment of the invention.
Figure 6:
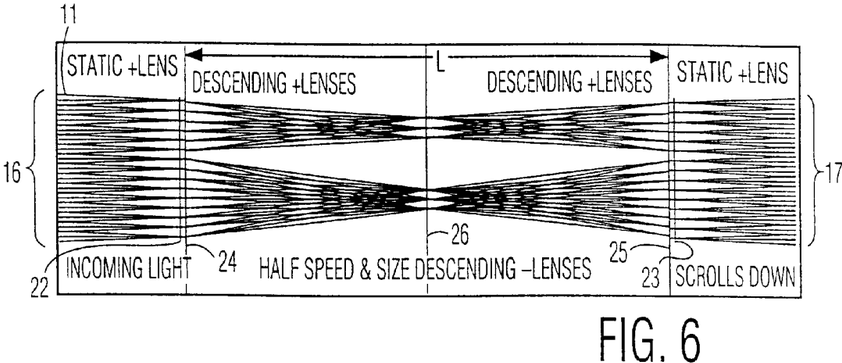
FIG. 6 shows the effect of acceptance angle of the third embodiment.

FIG. 5 shows a third embodiment of the invention, in which, for a system with positive cylinder lens arrays, as described above with respect to FIG. 3, an internal relay lens array 26 can be added that eliminates the problem of loss of outer edges of the input beam. The added center array 26 moves at half the speed, has half the lens size, and a four times shorter focal length than the other lenses in the system 22, 23, 24, 25. For synchronous linear array movement and ideal lenses, the output light pattern is now fully independent of the input ray angle for telecentric beam opening angles up to the cone that corresponds to the full input and output aperture (array lens size) at input to output distance, as shown in FIG. 6.

Although the scanner transfer function as described above in Examples 1, 2 and 3 is in principle ideal, a linear lens-array movement does not lend itself easily to continuously scrolling systems. Depending on the details of the application, the linear movement can be replaced by a saw-tooth movement with quick jerk-backs, or by a belt/chain like mechanism that makes the linear movement continuous.

EXAMPLE 4

Figure 7A:
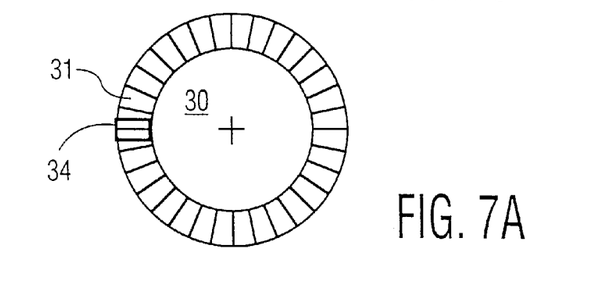
FIGS. 7A, 7B, 7C and 7D show, respectively, a radially oriented cylindrical lens structure on a disk, a tangentially oriented cylindrical lens structure on a disk, an axially oriented cylindrical lens structure on a drum and a lens structure oriented perpendicular to the axis of a drum.
Figure 7B:
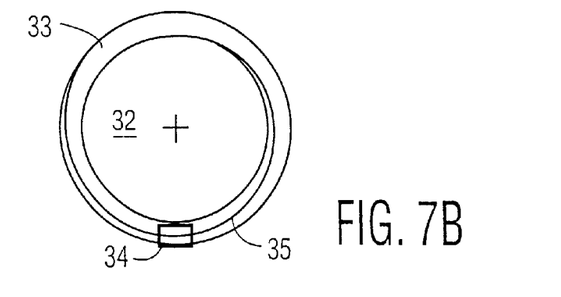

FIGS. 7A, 7B, respectively, show a radially oriented cylindrical lens structure 31 on a disk 30 and a tangentially oriented cylindrical lens structure 33 on a disk 32. The beam aperture is indicated by a fat lined rectangle 34. In a disk embodiment, a pair (or three, in the case of the third embodiment) of disks may be provided, spaced appropriately, to provide the scanning optical function. Parallel moving positive lens arrays could, for example, be mounted on a single rotating shaft disposed between the input and output apertures.

It is therefore understood that these disk optics 30, 32 may replace the linearly moving optics 14, 15, 24, 25, 26 depicted in FIGS. 1, 3 and 5, to provide analogous respective optical functions.

Figure 8A:
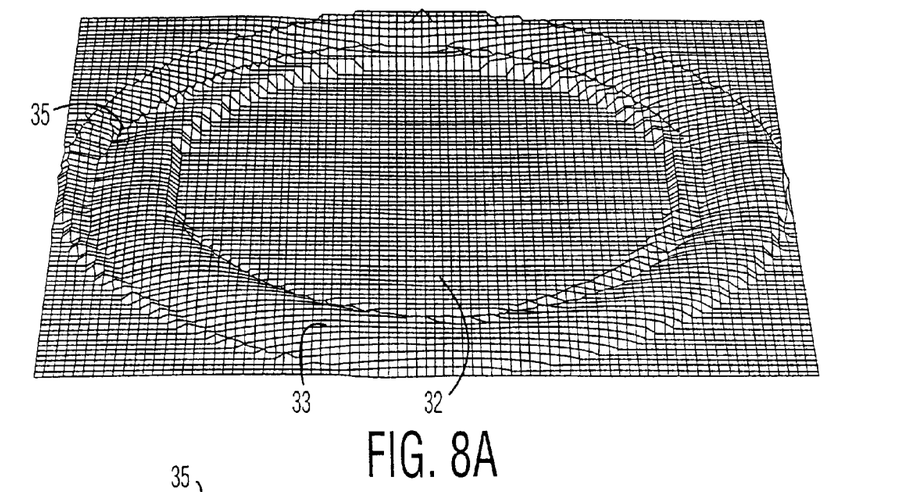
FIGS. 8A and 8B show, respectively, a wireframe model of a surface of a single (see FIG. 7B) and half-size cylindrical lens structure tangentially oriented on a disk.

FIG. 7B shows an implementation where the moving array of FIG. 1, 3 or 5 is replaced by a single cylinder lens 33 that spirals on a disc 32, as shown in more detail in the wireframe model of FIG. 8A. One revolution of the disk 32 corresponds to a shift of a corresponding linear array of Examples 1, 2 or 3 by a shift over one lens element. The imaging error introduced by the spiral tilt 35 is easily corrected by a slight lateral shift of the beam aperture 34; this leaves the small imaging error from the spiral curvature.

Figure 8B:
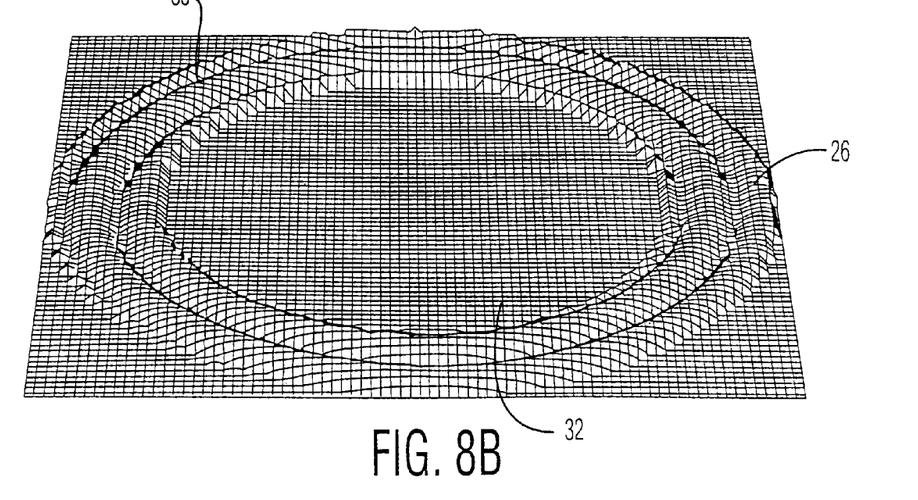

According to this embodiment, parallel moving positive lens arrays can be mounted on a single shaft, but now the opposite moving negative lens arrays can also be mounted on a single shaft by using a backwards (negative) spiraling lens, or simply mounting two identical disks back to back. Even the half speed, half size center lens elements 26 can be mounted on the same shaft by using a spiral of half pitch, as illustrated in the wireframe model of FIG. 8B.

EXAMPLE 5

Figure 7C:
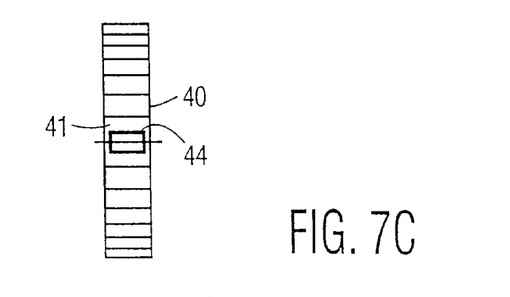

FIG. 7C shows cylinder lenses 41 mounted on the cylindrical surface of a drum 40. The cylinder lenses 41 are parallel to the drum 40 shaft. A small imaging error is introduced by the tilt and circular travel of the lenses 41.

Figure 7D:
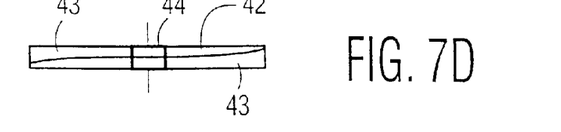

FIG. 7D shows a drum where the array is replaced by a single cylinder lens 43 that is wound in a helix around a drum 42. This is somewhat similar to FIG. 7B. The two parallel moving positive lenses 43 could be part of the same drum 42. The beam aperture is again indicated by a fat lined rectangle 44.

Figure 9:
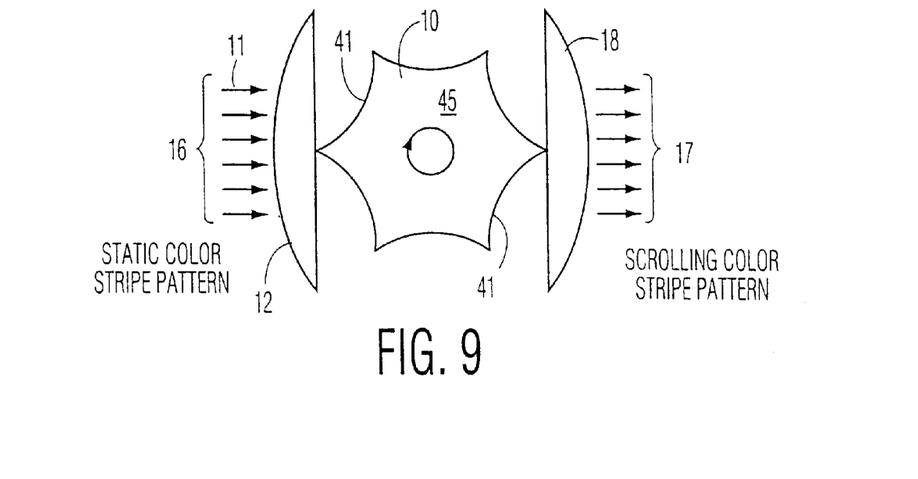
FIG. 9 shows a fourth embodiment of the invention having a rotating prism with concave faces.

In the case of a drum 40, 42 with negative lenses, light may pass twice through the drum 40, 42, across a diameter, thus requiring only a single rotating structure. This is shown in FIG. 9, with a solid rotating structure 45. This embodiment can also be understood as a rotating prism with concave faces. In accordance with the preferred embodiments of the invention, the scan optic is surrounded with prefocus and postfocus optics.

Where parallel moving optics are required, such as the embodiments described in Examples 2 and 3, the beam may be internally redirected in a hollow drum, either parallel to the axis of the drum (to another optic of appropriate configuration, having synchronized movement) or through another face of the drum. The redirection element may be, for example, a static mirror or prism.

Likewise, the third positive lens 26 of Example 3 may be provided by a static cylindrically curved mirror or lens of the correct curvature appropriately disposed in the optic path, e.g., in the center of the drum.

It is also possible to provide a conical arrangement of cylindrical lenses, with slight aberrations, which have an optical axis divergent from the central axis of the drum-like cone.

It is therefore understood that these drum optics may replace the linearly moving optics depicted in FIGS. 1, 3 and 5, to provide the same respective optical function.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. An optical scanner having a scan optic subsystem with a scan function subject to substantial nonlinear aberrations in image transfer over wide apertures, wherein compensation optics are provided to correct said aberrations in image transfer in said scan optic subsystem, said compensation optics having a prefocus optic of lens with a line focus for transmitting a light pattern to be scanned by said scan optic subsystem, and a postfocus optic of lens with a line focus for receiving a scanned light pattern from said optic subsystem and wherein said prefocus and postfocus optics are symmetric.

2. The optical scanner according to claim 1, wherein said compensation optics are stationary.

3. The optical scanner according to claim 1, wherein said optical scanner has an input aperture angle corresponding to about $1/f=1$.

4. The optical scanner according to claim 1, wherein said scan optic subsystem comprises an input optical element having at least two discontinuities separated by a continuous optical function, wherein said optical scanner has an imaging input aperture of about a separation distance of said at least two discontinuities.

5. The optical scanner according to claim 1, wherein said scan function is a scrolling scan function.

6. The optical scanner according to claim 1, wherein said optical scanner receives a plurality of stationary light bands over a wide aperture and produces an image of said plurality of light bands in a scrolling movement pattern.

7. The optical scanner according to claim 1, wherein said compensation optics correct said image aberrations to provide a sharp scanned image over a full input aperture range.

8. The optical scanner according to claim 1, wherein said image aberrations are, corrected to provide an accurate scanned two-dimensional image.

9. The optical scanner according to claim 1, wherein the compensation optics and the scan optic subsystem together accurately scroll the input pattern to an output pattern according to the formula:

$$x_o(t)/X = (t/T + x_i/X) \text{ modulo } 1,$$

with X being the total height of input and output beam, $x_i$ being the ray height in the input beam, $x_o$ being the corresponding ray height in the output beam as a function of time, T being the frame period, and t being the time.

10. The optical scanner according to claim 1, wherein said compensation optics are arranged to prefocus an input pattern on, and postfocus an output optical pattern from, the scan optic subsystem, to achieve transfer of a scanned image.

11. The optical scanner according to claim 1, wherein said compensation optics comprise:

(a) an input compensation optic, arranged to prefocus an input pattern comprising a set of parallel light rays as a set of converging rays; and (b) an output compensation optic, arranged to postfocus a set diverging rays as a set of parallel rays, and said scan optic subsystem is disposed in an optical path between said input compensation optic and said output compensation optic, said scan optic subsystem having an axis of movement and being for converting said set of converging rays into a set of scrolling diverging rays, wherein said optical scanner images said input pattern as said set of scrolling parallel rays.

12. The optical scanner according to claim 1, wherein said scan optic subsystem comprises a linearly displaceable array of cylindrical lenses.

13. The optical scanner according to claim 1, wherein said scan optic subsystem comprises a rotatable array of quasi-cylindrical lenses.

14. The optical scanner according to claim 1, wherein said scan optic subsystem comprises a lens structure disposed on a rotatable disk to provide a time-variable optical function with respective rotation of said disk.

15. The optical scanner according to claim 1, wherein said scan optic subsystem comprises an array of lens structures disposed concentrically on a rotatable drum.

16. The optical scanner according to claim 1, wherein said scan optic subsystem comprises a pair of arrays of lens structures having a virtual focus and moving antiparallel with respect to each other.

17. The optical scanner according to claim 1, wherein said scan optic subsystem comprises a pair of arrays of lens structures having a real focus and moving parallel with respect to each other.

18. The optical scanner according to claim 1, wherein said scan optic subsystem comprises a pair of arrays of lens structures and a centrally located relay lens structure.

19. The optical scanner according to claim 1, wherein said compensation optics are approximately cylindrical.

20. The optical scanner according to claim 1, wherein said compensation optics comprise static pre- and post-focus lenses, and said scan optic subsystem comprises displaceable lens portions, wherein each of said pre and post focus lenses and said displaceable lens portions have a focal length approximating a distance between input and output image planes.

* * * * *